Nov. 4, 1952        W. C. HEATH        2,617,004
ELECTRIC FLASH WELDING
Original Filed March 26, 1943
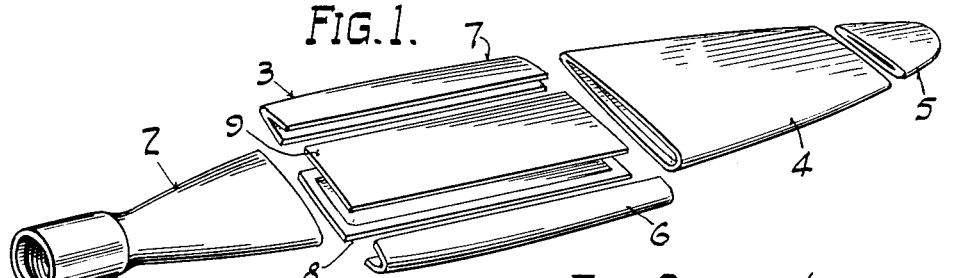
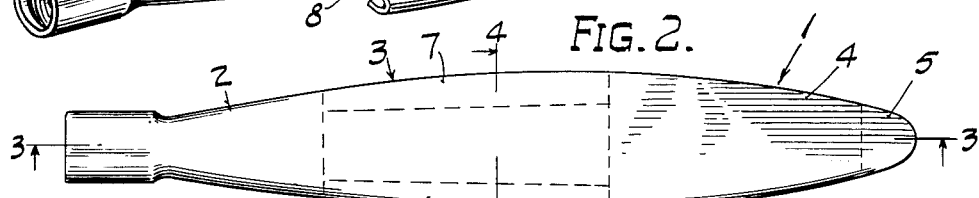
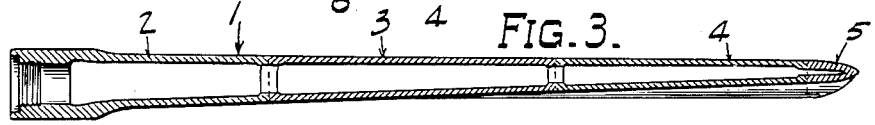
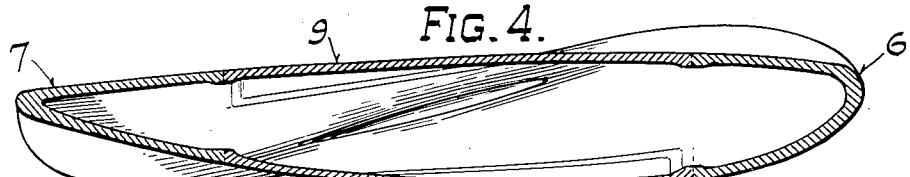
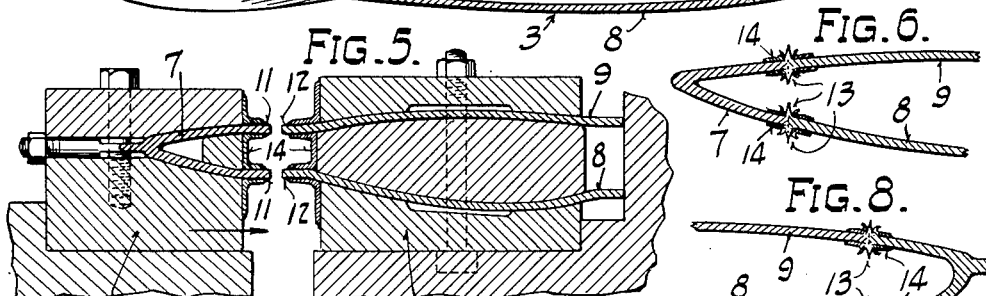
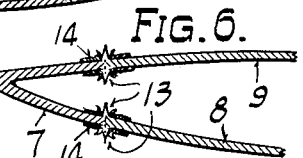
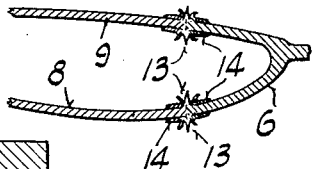
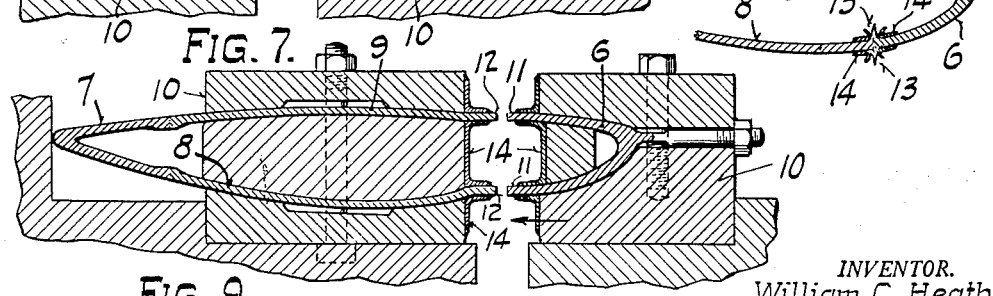
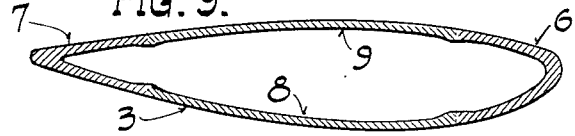
INVENTOR.
William C. Heath
BY Andrus & Sceales
ATTORNEYS.

Patented Nov. 4, 1952

2,617,004

UNITED STATES PATENT OFFICE 2,617,004

ELECTRIC FLASH WELDING

William C. Heath, Milwaukee, Wis., assignor to A. O. Smith Corporation, Milwaukee, Wis., a corporation of New York Original application March 26, 1943, Serial No. 480,682. Divided and this application December 23, 1949, Serial No. 134,745

2 Claims. (Cl. 219—10)

This invention relates to electric flash welding and to flash welded joints produced thereby.

The principal object of the invention is to provide for a reduction in the flash extrusion at the welds in an electrically flash welded article.

Another object of the invention is to improve the metallurgy of the weld and provide a weld of more uniform constituency having more nearly the characteristics of the parent metal stock.

Another object is to reduce and substantially eliminate the problem of flash sputter sticking to the plate stock in regions remote from the weld and to the welding dies.

The invention has been applied to the manufacture of hollow steel airplane propeller blades, and constitutes subject matter divided out of applicant's copending application Serial No. 480,682, filed March 26, 1943 (now abandoned), for Electrically Welded Hollow Steel Propeller Blade and Method of Making the Same.

In the manufacture of such propeller blades by electric flash welding it is desirable to obtain a flash extrusion at the seam which is at least somewhat friable and easy to remove, particularly in the narrow confines of the inside of the blade. Furthermore, it is also desirable in such manufacture to obtain a flash welded joint which has metallurgical and physical characteristics as near to those of the plate stock as possible.

The problem of removal of flash extrusion at the seam of electrically flash welded articles has been well known, and articles such as propeller blades which have to be made to close tolerances as to balance and have relatively narrow internal dimensions making flash removal additionally difficult have generally been considered impossible of manufacture by electric flash welding.

In carrying out the present invention a new principle in electric flash welding is employed, i. e. the utilizing of a stock alloy which has a greater strength at temperatures within the plastic range of the metal, whereby the amount of flash extrusion is greatly reduced and the relatively thin extrusion is readily cut for removal without danger of injuring the remaining weld. The thin flash extrusion has a tendency to become air quenched by rapid cooling after welding and to be brittle and easily removed, as compared to relatively thick and tougher flash extrusions.

Steels containing small amounts of vanadium, molybdenum or chromium, or any combination thereof, have been found to have the characteristics desired for the practice of the present invention.

With such alloy steels, the greater strength of the metal in the plastic temperature range provides a greater resistance to upset and thereby more readily transmits the welding pressures to the meeting edges between the parts being welded without pronounced upset of the metal adjacent the edges. A more narrow band of fluidity is obtainable upon the edges and less carbon or alloy segregation is obtained in the final joint than with plain carbon steels and the like.

The invention is illustrated as applied to the electric flash welding of a propeller blade.

In the drawings:

Figure 1 is an isometric view of the parts prior to assembly by welding;

Fig. 2 is a plan view of the finished welded blade after machining and balancing;

Fig. 3 is a central longitudinal section taken on line 3—3 of Fig. 2;

Fig. 4 is a central transverse section taken on line 4—4 of Fig. 2;

Fig. 5 is a typical enlarged central transverse section showing a trailing edge and the foils clamped in position for welding;

Fig. 6 is a similar section taken immediately after welding and prior to the flash removal;

Fig. 7 is similar to Fig. 5 showing the welding of the leading edge to the foils;

Fig. 8 is similar to Fig. 6 showing the welds between the leading edge and the two foils prior to flash removal; and Fig. 9 is a transverse section of the completed central body section after welding and flash removal.

The blade 1 illustrated is made in a plurality of sections and which may be described as a shank section 2, a body section 3, a tip section 4 and an end tip 5, all of the sections being electrically flash welded together along transverse lines to complete the blade.

The several blade sections 2, 3, 4 and 5 may be formed as described in the copending application referred to above. For the purpose of illustration, the body section 3 is constructed of four parts: the leading edge forging 6, the trailing edge forging 7, the camber face 8 and the thrust face 9. The several parts 6, 7, 8 and 9 are electrically flash welded together along generally longitudinal lines to complete the body section.

The formation of parts 6, 7, 8 and 9 is described more particularly in the copending application referred to above and need not be repeated here.

In the electric flash welding operations the parts are clamped in welding electrodes 10, as shown in Figs. 5 and 7, with their respective complementary edge portions 11 and 12 projecting toward one another and aligned for welding. The welding potential is applied and the respective opposing edges are moved toward each other until a flashing arc is set up by the current passing from edge to edge. The continued feeding of the parts relatively toward each other is governed in accordance with the flashing off of the metal at the edges and when a sufficient heating of metal immediately adjacent the edge faces is attained, the remaining edges are abutted under pressure and the welding current discontinued. Generally, from one-eighth to one-quarter of an inch of metal is consumed by the flashing off of metal from each edge, and the parts are constructed with sufficient additional metal at the edges to compensate for this and for the extrusion of metal at the joint in the final bump.

In flash welding a much higher temperature of the metal on the opposed edge surfaces is reached than in ordinary electric resistance welding. This is true because flash welding employs a heating of the edges without pressure contact therebetween and involves the melting and subsequent expulsion of preliminary contacting edge portions by the sudden super-heating and gasification of constituents of the contacting metal. The above described expulsion occurs in rapid successive explosions of the highly heated metal particles all along the edges as soon as the flashing process has been established throughout the edges. At the time of the final bumping of the edges together under pressure the fluid metal layer at the meeting faces of the edges is extruded under pressure laterally from the joint carrying with it most of the oxides that may be present.

Upon completion of the longitudinal electric flash welding operations between the trailing edge forging 7 and the foils 8 and 9 the flash extrusion 13 is removed from both the inside and outside, preferably by a chisel or other suitable tool, and then the seam is dressed as by a belt sander or other device to smooth the same in line with the contour of the parts. Following this operation, the leading edge forging 6 is electric flash welded to the remaining longitudinal edges of the foils 8 and 9 and the welds cleaned in the manner above described. Where the material of the blade or other article has a tendency to harden at the line of the weld it may be advisable to remove the hardness by a partial anneal before removal of the flash.

In carrying out the present invention, a relatively high strength low alloy steel is employed. The steel employed has a greater strength in the plastic temperature range than ordinary steels. It is also possible that it has a lower melting point than ordinary steel thereby tending to produce a more narrow band of plastic metal adjacent the weld line.

These factors combined with the sharper line of strength gradient of this alloy at the zone between the plastic and fluid temperature ranges result in an extrusion of the flash 13 in a very narrow line at the weld and make it comparatively easy to chisel the flash from the weld.

The higher strength of this alloy in the plastic temperature range enables the transmission of the requisite welding pressure to the joint without the accompanying extrusion of a substantial part of the plastic metal immediately behind the fluid surface layer, as compared to the flash welding of ordinary steel. This results in a narrow line of extruded metal and becomes important in the manufacture of propellers due to the fact that the flash on the inside of the blade is relatively inaccessible and therefore ordinarily difficult to remove.

Furthermore, the narrow line of flash is obtained under conditions of bump and pressure giving a very high quality weld. A higher bump pressure may be employed.

The blade or other article may be composed of an alloy of the following composition:

| | Percent |
|---|---|
| Carbon | .35–.40 |
| Manganese | .60–.80 |
| Nickel | 1.65–2.00 |
| Chromium | .70–.90 |
| Molybdenum | .20–.30 |
| Silicon | .35 maximum |
| Copper | .25 maximum |
| Phosphorus | .04 maximum |
| Sulphur | .04 maximum |

Balance iron.

A small percentage of vanadium, up to about .20%, may be employed, if desired.

Other alloys may be employed that will tend to reduce the thickness of flash and thereby facilitate its removal. In general, vanadium, molybdenum, chromium and to some extent nickel, when added to steel in small amounts, will have the effect described of producing a narrow line of flash by raising the strength of the metal in the plastic temperature range. These alloy ingredients may be used alternatively or in any desired combination depending upon the characteristics of the steel desired for the article to be welded.

By reason of the characteristics of the alloy the weld sputter in the form of condensed globules of flash which are expelled from the edges has less tendency to stick or fuse to metal objects, such as the parts being welded and the welding electrodes, upon which it falls. The greater strength of the sputter globules reduces the flattening of the globules against the metal surface, and any interfusing that occurs is over a smaller area, making removal a relatively easy matter.

In the manufacture of propellers and the like it is highly important to avoid the sticking of sputter to the inside surfaces of the pieces being welded. Sputter, when welded to the surface of the parts, is extremely difficult to remove, and if not removed it may seriously hamper the balancing of the blade.

While the alloy content of the metal makes for less softness of the sputter and consequent less tendency of it to stick, it is desirable to prevent sticking of the sputter as by employing a coating 14 on the parts and on the adjacent welding electrodes.

A suitable composition for coating 14 to prevent the welding of sputter to the surface of the parts contains a large amount of magnesium and calcium silicates with calcium oxide and a small amount of graphite. Various compositions may be employed within the scope of the invention, the essence lying in providing a material with refractory ingredients which prevent sticking of the sputter to the parts.

Various embodiments of the invention may be employed within the scope of the accompanying claims.

I claim:

1. An electrically flash welded article, comprising a plurality of sections of low alloy steel containing a small percentage of a flash reducer selected from the following metals: vanadium, molybdenum and chromium.

2. In the manufacture of metal articles by electric flash welding, the forming of parts of the article from low alloy steel containing a small percentage of one or more of the following ingredients: vanadium, molybdenum and chromium; electrically flash welding a seam between two of said parts, and thereafter cleaning the flash from both surfaces of said seam.

WILLIAM C. HEATH.

REFERENCES CITED

The following references are of record in the file of this patent:

UNITED STATES PATENTS

| Number | Name | Date |
|---|---|---|
| 1,958,158 | Budd | May 8, 1934 |
| 2,014,240 | Tarbox et al. | Sept. 10, 1935 |
| 2,085,583 | Hanson | June 26, 1937 |
| 2,278,487 | Rakos | Apr. 7, 1942 |

FOREIGN PATENTS

| Number | Country | Date |
|---|---|---|
| 200,952 | Great Britain | July 26, 1923 |
| 797,762 | France | Feb. 24, 1936 |

OTHER REFERENCES

Woldman and Metzler, "Engineering Alloys," 1945 edition.